(12) United States Patent
Meuter

(10) Patent No.: US 8,250,935 B2
(45) Date of Patent: Aug. 28, 2012

(54) TORQUE MEASUREMENT DEVICE AND ARRANGEMENT COMPOSED OF A TORQUE MEASUREMENT DEVICE AND A DRIVE SHAFT

(75) Inventor: Herbert Meuter, Herzogenrath (DE)

(73) Assignee: GIF Gesellschaft fuer Industrieforschung mbH, Alsdorf (DE)

( * ) Notice: Subject to any disclaimer, the term of this patent is extended or adjusted under 35 U.S.C. 154(b) by 0 days.

(21) Appl. No.: 12/806,792

(22) Filed: Aug. 20, 2010

(65) Prior Publication Data

US 2011/0041625 A1 Feb. 24, 2011

(30) Foreign Application Priority Data

Aug. 23, 2009 (DE) .......................... 10 2009 038 363
Sep. 8, 2009 (DE) .......................... 10 2009 040 480

(51) Int. Cl.
*G01L 3/00* (2006.01)
*G01L 1/22* (2006.01)

(52) U.S. Cl. .......... 73/862.338; 73/862.321; 73/862.045

(58) Field of Classification Search .............. 73/862.321, 73/862.325, 862.338, 862.041–862.045
See application file for complete search history.

(56) References Cited

U.S. PATENT DOCUMENTS

| | | | |
|---|---|---|---|
| 3,800,591 A | 4/1974 | Tveter | |
| 4,674,339 A * | 6/1987 | Hatamura et al. | 73/862.042 |
| 5,033,314 A * | 7/1991 | Draisey | 73/862.045 |
| 5,374,134 A * | 12/1994 | Gustafsson et al. | 403/365 |
| 5,490,427 A * | 2/1996 | Yee et al. | 73/767 |
| 5,672,834 A * | 9/1997 | Searle et al. | 73/862.338 |
| 5,894,094 A * | 4/1999 | Kuchler et al. | 73/862.044 |
| 6,269,702 B1* | 8/2001 | Lambson | 73/862.045 |
| 6,439,063 B1* | 8/2002 | Schnackenberg | 73/862.041 |
| 7,032,465 B2* | 4/2006 | Kanayama et al. | 73/862.338 |
| 7,520,182 B2* | 4/2009 | Takamura et al. | 73/862.321 |
| 7,665,373 B2* | 2/2010 | Sakers et al. | 73/862.338 |
| 2009/0314103 A1* | 12/2009 | Sakers et al. | 73/862.321 |
| 2010/0162830 A1 | 7/2010 | Meuter et al. | |

FOREIGN PATENT DOCUMENTS

| | | |
|---|---|---|
| DD | 279 311 | 5/1990 |
| DE | 35 28 364 | 2/1987 |
| DE | 19525231 A1 * | 1/1997 |
| DE | 199 36 293 | 2/2001 |
| DE | 10055933 A1 * | 5/2002 |
| DE | 101 06 625 | 8/2002 |
| DE | 103 04 359 | 11/2003 |
| DE | 10 2007 005 894 | 12/2007 |
| EP | 0 575 634 | 12/1993 |
| EP | 1 074 826 | 2/2001 |
| EP | 1688726 A1 * | 8/2006 |
| EP | 2 113 758 | 11/2009 |
| WO | WO 2007/143986 | 12/2007 |
| WO | WO 2009/062481 | 5/2009 |

* cited by examiner

*Primary Examiner* — Lisa Caputo
*Assistant Examiner* — Jonathan Dunlap
(74) *Attorney, Agent, or Firm* — Collard & Roe, P.C.

(57) ABSTRACT

The invention relates to a torque measurement device having a torque measurement shaft disposed between two flanges, whereby an intermediate shaft is provided between at least one of the two flanges and the measurement shaft, which intermediate shaft is disposed axially at the same height as the measurement shaft, on a different radius.

20 Claims, 7 Drawing Sheets

Figure 1:
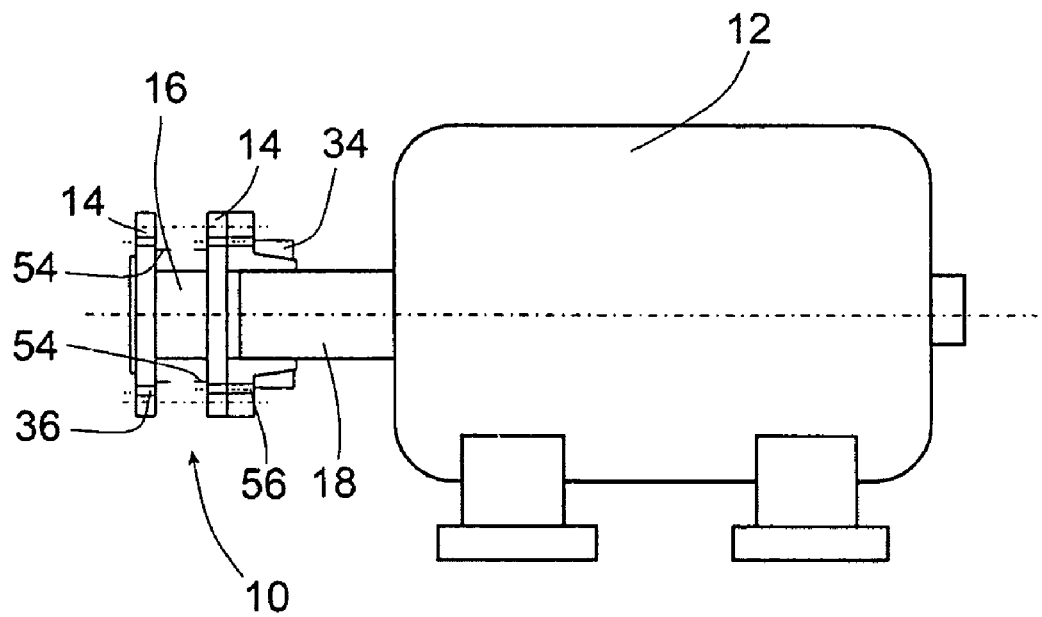

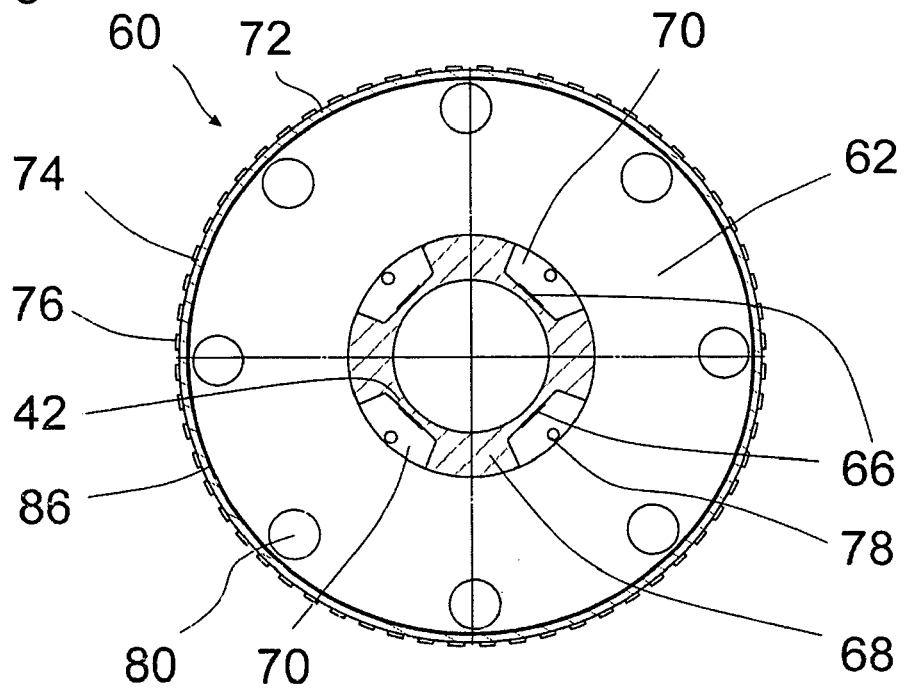
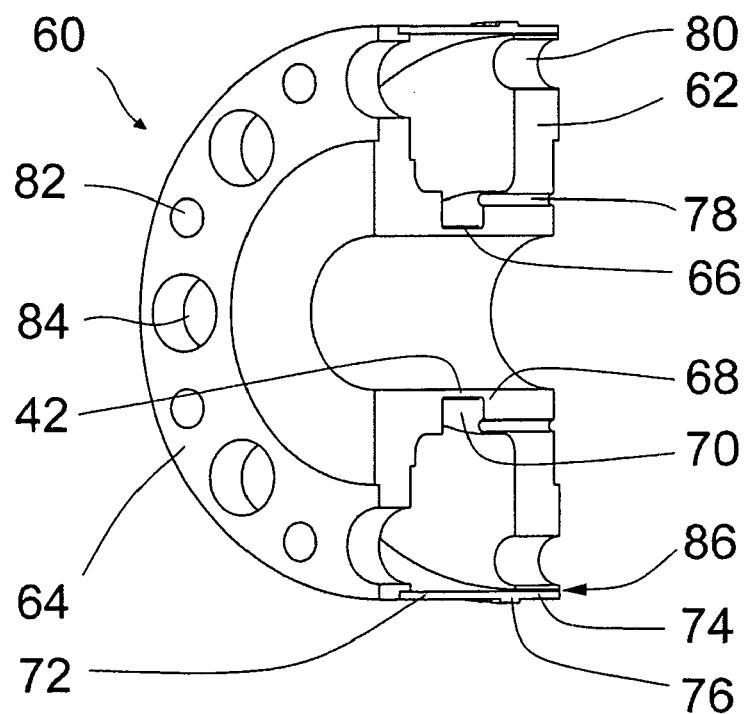

TORQUE MEASUREMENT DEVICE AND ARRANGEMENT COMPOSED OF A TORQUE MEASUREMENT DEVICE AND A DRIVE SHAFT

CROSS REFERENCE TO RELATED APPLICATIONS

Applicant claims priority under 35 U.S.C. §119 of German Application No. 10 2009 038 363.8 filed Aug. 23, 2009 and German Application No. 10 2009 040 480.5 filed Sept. 8, 2009, the disclosures of which are incorporated by reference.

The invention relates to a torque measurement device having a torque measurement shaft disposed between two flanges. The invention furthermore relates to an arrangement composed of a torque measurement device and a drive shaft, whereby the torque measurement device has a torque measurement shaft or a torque measurement disk.

Torque measurement devices having two flanges are known from the state of the art, in two basic embodiments. On the one hand, as disclosed in DE 103 04 359 A1, for example, a torque measurement disk can be provided between the two flanges, which disk, in the final analysis, is disposed essentially perpendicular to the axis of rotation, so that the two flanges naturally must have different diameters. On the other hand, a torque measurement shaft can be provided between the two flanges, whereby then, the two flanges are provided at the shaft ends, in each instance, as disclosed in DE 199 36 293 A1, EP 2 113 758 A2, U.S. Pat. No. 3,800,591, WO 2007/143986 A1, WO 2009/062481 A1, and EP 1 074 826 B1, but also in DD 279 311 A1, DE 101 06 625 A1, or DE 35 28 364 A1.

EP 1 074 826 B1, for example, shows a torque measurement device having an essentially cylindrical torque measurement shaft disposed between two flanges in the shape of circular ring disks, in which shaft recesses are disposed, whose bottoms form essentially cylindrical measurement membranes and close off the recesses radially, whereby the torque measurement shaft forms a closed tubular section that connects the flanges, as a measurement region of the torque measurement device. Three large recesses are introduced into the torque measurement shaft, so that three essentially cylindrical measurement membranes are obtained. In this connection, the measurement membranes close off the recesses radially, so that measurement pockets are obtained, and the torque measurement shaft as such continues to remain closed, and strain gauges disposed radially on the inside, as well as the related electronics, are hermetically encapsulated, in simple manner, and are protected from humidity in the air, dirt, oil mist, or aggressive environmental influences.

The invention is based on the task of making available an improved torque measurement device and/or an improved arrangement of a torque measurement device and a drive shaft.

As a solution, the invention proposes, on the one hand, a torque measurement device having a torque measurement shaft disposed between two flanges, in which recesses are disposed, the bottoms of which form measurement membranes and which close off the recesses radially, whereby the torque measurement device is characterized in that the torque measurement shaft is configured to be hollow and has openings that point from radially on the inside to radially on the outside.

In this regard, in the present case, the torque measurement shaft is configured in one piece with the membranes of the recesses, and the openings are accordingly also provided in this module.

For a distinction, particularly from EP 1 074 826 B1, the response behavior of the torque measurement shaft or of the torque measurement device can be adapted to existing general conditions by means of the openings. Thus it is possible, for example, by means of the openings, to minimize influences of speed on the zero point, influences on the zero point brought about by means of the attachment to other components, a temperature-dependent shift in the zero point, and the like. Likewise, the transverse force behavior, particularly also with regard to the zero point, can be optimized. Also, the general possibility of influencing the sensitivity of each measurement membrane, the linearity of the overall system, can be influenced, particularly for every load direction. In this connection, this solution makes use, on the one hand, of the advantages of closed recesses or measurement pockets, in order to intentionally accept the disadvantage of difficult sealing with regard to humidity in the air, dirt, oil mist, or aggressive environmental influences, and to be able to optimize the torque measurement shaft in its response behavior, by means of the separate openings, which are thus not situated in the recesses or in the vicinity of the measurement membranes.

In this connection, it is understood that the openings can be closed off by means of a sealing material, for example by means of an adhesive, by means of solder, or by means of a small screw, in order to continue to guarantee the best possible seal.

It is also possible to use the openings as cable ducts, so that these can perform a dual function.

Preferably, the openings are bores, since bores can be made available in extremely simple and operationally reliable manner.

If a torque measurement device is connected with a drive shaft, by way of one of the two flanges, in order to form a torque measurement unit, in the solutions known according to the state of the art, the torque measurement shaft or the torque measurement disk is spaced apart from the drive shaft in the axial direction of the latter. Thus, limits are set for the minimal possible distance between the drive shaft and a component coupled with the other flange, such as, for example, another shaft or an axle, due to the expanse of the torque measurement shaft or torque measurement disk in the axial direction, since it is not possible to go below a required minimum distance between the drive shaft and the rotating component, even in the case of a compact configuration of the torque measurement shaft or disk and a compact configuration of the flange, without significant losses in mechanical stability or the permissible stress on the drive shaft.

In order to create a mechanically stable connection between a drive shaft and another component, and in doing so to significantly reduce the distance between the drive shaft and the component, as compared with known arrangements, a torque measurement device having a torque measurement shaft disposed between two flanges is proposed, independent of the other characteristics of the present invention, whereby an intermediate shaft is provided between at least one of the two flanges and the measurement shaft, which intermediate shaft is disposed axially at the same height as the measurement shaft, on a different radius.

In this connection, it is provided that the intermediate shaft is disposed axially at the same height as the measurement shaft, on a different radius. The intermediate shaft is provided between at least one of the two flanges and the torque measurement shaft, whereby here, the term "between" does not relate to the spatial arrangement, but rather relates to the flow of force or torque. In this regard, for example, the hollow shaft of DD 279 311 A1 is set on parallel to the torsion rod that is introduced into the hollow shaft and used as the torque measurement shaft, and specifically not disposed between the torsion rod and one of the flanges. Furthermore, in the present connection, the term "shaft" describes any device that transfers torque and is not disposed essentially perpendicular to the axis of rotation, such as, for example, a torque measurement disk or a flange.

In contrast to known solutions, the torque measurement device according to the invention can be connected with a drive shaft, by way of one of the two flanges, in such a manner that the torque measurement shaft is disposed axially at the height of the drive shaft and radially outside of the drive shaft, so that another component, such as, for example, a shaft or an axle, can be brought very close to the drive shaft by connecting it to the other of the two flanges. Thus, the creation of a rotationally fixed connection between a drive shaft and another component is possible with the torque measurement device according to the invention, whereby the distance between the drive shaft and the other component can be significantly reduced as compared with known arrangements. The torque measurement device according to the invention thus allows a method of construction that is very compact and saves space axially. This is particularly advantageous if the space available for a torque measurement is very limited, as can be the case in practice, for example when measuring torque in connection with large driving devices, whose axial expanse can amount to up to 5 meters and more. The torque measurement shaft and the intermediate shaft can have identical or essentially identical axial lengths. However, they can also have different axial lengths, in order to thereby be able to provide the flanges at axially different positions.

Drive shafts of driving devices, particularly of electric machines, can only be loaded with a maximal mass that can be coupled on, in most cases, which mass becomes smaller and smaller with an increase in the distance from the driving device. When this maximal mass that can be coupled on is exceeded, an overload and/or an imbalance can occur during operation of the driving device. The method of construction made possible according to the invention, which saves axial space, therefore advantageously allows a significant increase in the maximal mass that can be coupled on, as compared with known solutions.

Preferably, a connecting flange is provided between the measurement shaft and the intermediate shaft. By way of the connecting shaft, a torque that is introduced between the torque measurement shaft and the intermediate shaft can be transferred in structurally simple and operationally reliable manner. It is particularly preferred if the connecting flange is configured in one piece with the torque measurement shaft and/or the intermediate shaft. Furthermore, one or each of the two flanges can be configured in one piece with the torque measurement shaft and/or the intermediate shaft.

In a preferred embodiment, the intermediate shaft has a greater radius than the measurement shaft. With this preferred embodiment, the torque measurement shaft, which allows a torque measurement, in known manner, for example by way of recording strain gauge signals, can be effectively protected by the intermediate shaft. In particular, the placement of the torque measurement shaft on a smaller radius also allows effective protection against overly great bending moments. Such protection also extends to cover additional modules, such as, for example, electronic components, shear force transducers, or strain gauges, which are disposed on the measurement shaft, and also includes protection against mechanical influences, such as, for example, damage caused by contact with other components.

In this regard, independent of the other characteristics of the present invention, a torque measurement device having a torque measurement shaft disposed between two flanges, which is characterized by a protective cover that is disposed radially outside of the measurement shaft, can offer corresponding protection also in difficult operating conditions, particularly if the measurement shaft is disposed at least on one of the two flanges, so that the torque measurement device, particularly also as a distinction from DE 35 28 364 A1, can continue to be built as narrow as possible, and its torque measurement shaft can measure in as uninfluenced a manner as possible. This particularly holds true if openings are provided in the torque measurement shaft, as was already described above.

In this connection, it is understood that the intermediate shaft described above can be utilized as a protective cover, and this avoids the use of additional modules. In the case of torque measurement shafts that do not have intermediate shafts, however, it is advantageous if a separate protective cover is provided, which can be made available, for example, by means of a cylindrical pipe or by means of an appropriately bent piece of sheet metal. In the latter case, in particular, it is advantageous if the protective cover is attached to one of the flanges only on one side, so that no torque that could distort a measurement result is transferred by way of the protective cover.

On the other hand, the intermediate shaft, if it is switched in series with the measurement shaft, is also connected with one of the two flanges only on one side, and with the connecting flange or the measurement shaft, for example, on the other side, in order to only then be indirectly connected with the other of the two flanges.

According to another aspect of the invention, the stated task is accomplished by a torque measurement device having a torque measurement shaft or torque measurement disk disposed between two flanges, whereby one of the two flanges has at least one attachment element that can be activated through the second of the two flanges.

In this manner, the torque measurement device can be set very close to a large driving device, such as a motor, for example, accompanied by the possibility of significantly reducing the distance between the drive shaft of the driving device and another component, which are connected with one another in rotationally fixed manner by way of the torque measurement device. The possibility, provided according to the invention, of being able to activate the attachment element through the second of the two flanges, effectively avoids any disadvantageous axial lengthening of the torque measurement device known from the state of the art, caused by providing attachment elements that can be activated from the outside.

Preferably, the second of the two flanges has at least one activation opening. In this manner, a stable and simple solution is made available for being able to activate the attachment element. The attachment element can be activated through the activation opening, whereby the activation opening, particularly preferably, is a bore, which can be implemented in very simple manner structurally, and through which an activation means, for example in the form of a screwdriver, can be passed. Alternatively, the second of the two flanges can also have a recess by way of which the attachment element can be activated.

Preferably, the activation opening is larger than the corresponding opening of the corresponding activation element, such as, for example, a hole having a corresponding inside thread. This allows correspondingly simple passing through of the activation means even if the corresponding activation element, such as a screw head, for example, is larger than the corresponding opening of the corresponding activation element.

In order to detect an excessive bending stress of a torque measurement shaft or a torque measurement disk of the torque measurement device during operation of the torque measurement device, a torque measurement device is proposed, cumulatively or alternatively, which has at least one means for determining a bending moment that occurs perpendicular to an axis of rotation.

In this connection, the term "bending moment" refers to a moment that acts on the torque measurement device, having a component perpendicular to the axis of rotation, while the torques actually measured by the torque measurement device are oriented parallel to the axis of rotation of the torque measurement device.

Using such means for determining a bending moment that occurs perpendicular to the axis of rotation, the stress on the torque measurement shaft or the torque measurement disk of the torque measurement device can be effectively monitored, so that when an excessive bending stress is determined, suitable measures—such as, for example, reducing the speed of rotation, ending the measurement, or sorting out the corresponding measurement value—can be undertaken to avoid stress on the torque measurement shaft or the torque measurement disk. In this regard, the occurrence of measurement artifacts during a torque measurement undertaken by the torque measurement device can be effectively avoided or recognized by using the means. For example, the bending moment can also be determined by a distance measurement between the flanges, if an arrangement of a torque measurement device having two flanges and a measurement shaft that lies between them is provided, since a change in distance between the flanges is, of course, connected with a bending moment that accompanies on the measurement shaft. With the determination of the bending moment, it is also possible to control and limit this moment, so that cumulatively or alternatively, twisting processes can be controlled in terms of their extent.

Preferably, the bending moment is determined as a relative movement between a torque measurement shaft or torque measurement disk and another module, whereby the other module is preferably a counter-shaft. Particularly preferably, the torque measurement shaft is connected with the counter-shaft by way of a connecting flange or some other flange. The connecting flange or another flange provided between the counter-shaft and the measurement shaft brings about a spacing between the torque measurement shaft and the counter-shaft, so that in this configuration, a bending moment of the torque measurement device can be determined by means of a distance measurement between the torque measurement shaft and the counter-shaft, which measurement is very easy to perform.

Particularly preferably, the bending moment is measured in binary manner. By means of a binary measurement of the bending moment, a suitable reporting signal or warning signal, for example, can be output to a display device, for example, if a predetermined bending moment is exceeded or not reached. If, in particularly preferred manner, the torque measurement shaft is connected with the counter-shaft by way of a connecting flange, a critical bending moment or an excessive bending stress can be recognized, independent of rotation, by means of a simple binary contact measurement, in such a manner that a signal or a significant signal change is output to a display device or evaluation unit only if contact exists between the torque measurement shaft and the counter-shaft, as the result of an excessive bending stress. In this connection, the contact measurement can be undertaken, if the counter-shaft and the torque measurement shaft consist at least in part of a metallic material, preferably by way of a measurement of the electrical resistance between the counter-shaft and the torque measurement shaft, which resistance decreases significantly when contact exists between counter-shaft and torque measurement shaft.

As was already mentioned above, an intermediate shaft of the torque measurement device, for example, can be used as a counter-shaft. On the other hand, any other shaft, such as a drive shaft, for example, on which the measurement shaft is disposed, can be used accordingly.

In particular, the expansion sensors can be disposed exclusively radially on the outside of the torque measurement shaft. It has been shown that in this way, the measurement accuracy can be significantly increased, at the same geometric structure of the torque measurement shaft. The latter is particularly true for strain gauges as expansion sensors. In this connection, it is understood that if necessary, expansion sensors can also be disposed radially on the inside, as long as they do not participate in the measurement or are used for other measurements, for example having a lesser or greater precision, and as long as they do not significantly impair the measurements of the expansion sensors disposed on the outside.

In this connection, it has proven to be particularly advantageous if the expansion sensors are disposed on level surface regions of measurement membranes (42). In this way, particularly as already disclosed in WO 2007/143986 A1, permanent attachment of the expansion sensors can be guaranteed in simple and operationally reliable manner.

The task of the invention is furthermore accomplished by an arrangement consisting of a torque measurement device and a drive shaft, whereby the torque measurement device has a torque measurement shaft or a torque measurement disk, which device is characterized by at least one region of the torque measurement shaft or measurement disk disposed axially at the height of the drive shaft and radially outside of the drive shaft.

The drive shaft can particularly be a drive shaft or a driving shaft or a driven shaft of a driving device of a test bench, which is provided for the purpose of putting a load on a test object, at different torques, whereby the torque measurement device serves, in this connection, to measure the torque transferred to the test object.

The torque measurement shaft or the torque measurement disk is disposed, with at least one region, axially at the height of the drive shaft and radially outside of the drive shaft. By means of this arrangement, space can be saved axially, and this is advantageous particularly in the case of electric machines, since there, a maximal mass that can be coupled to the drive shaft is defined, which mass becomes constantly smaller particularly with an increasing distance from the machine. If this maximal mass that can be coupled on is exceeded, an overload and/or an imbalance can occur during operation of the driving device. The method of construction made possible by the arrangement provided, which saves space, therefore advantageously permits a significant increase in the maximal mass that can be coupled on, as compared with known solutions.

In a practical embodiment, the torque measurement shaft or the torque measurement disk is configured to be completely hollow, and is disposed radially on the outside, at the height of the drive shaft In another practical embodiment, the torque measurement shaft or the torque measurement disk is a torque measurement shaft that is essentially configured to be cylindrical or hollow-cylindrical.

The hollow or cylindrical or hollow-cylindrical configuration of the torque measurement shaft or the torque measurement disk has the result that the torque measurement disk or the torque measurement shaft has only a very slight moment of inertia, and therefore advantageously has only a negligible influence on the "torque" measurement variable.

In a preferred embodiment, the drive shaft is a shaft of an electric machine, namely of an electric motor or generator.

It is understood that depending on the concrete implementation of the present invention, if necessary, in place of a torque measurement disk or a torque measurement shaft, particularly if these can be used alternatively, as described above, transitional shapes, such as, for example, measurement bodies shaped in significantly more complex manner as a cone, can be used, but this might possibly make the actual measurement significantly more difficult.

It is furthermore understood that the characteristics of the solutions presented above and/or in the claims can be used both individually and together, whereby the latter correspondingly brings about an accumulation of the advantages of the corresponding characteristics.

Figure 2:
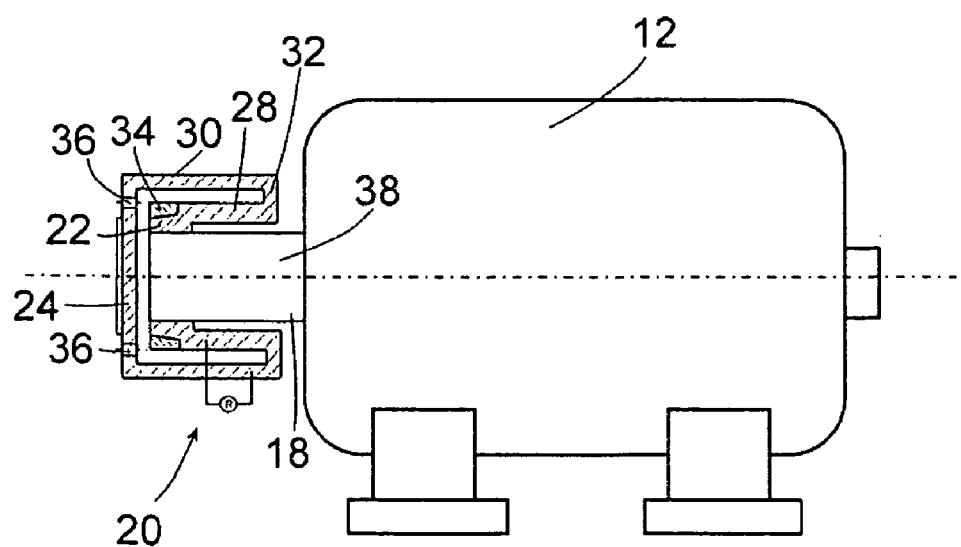
Figure 3:
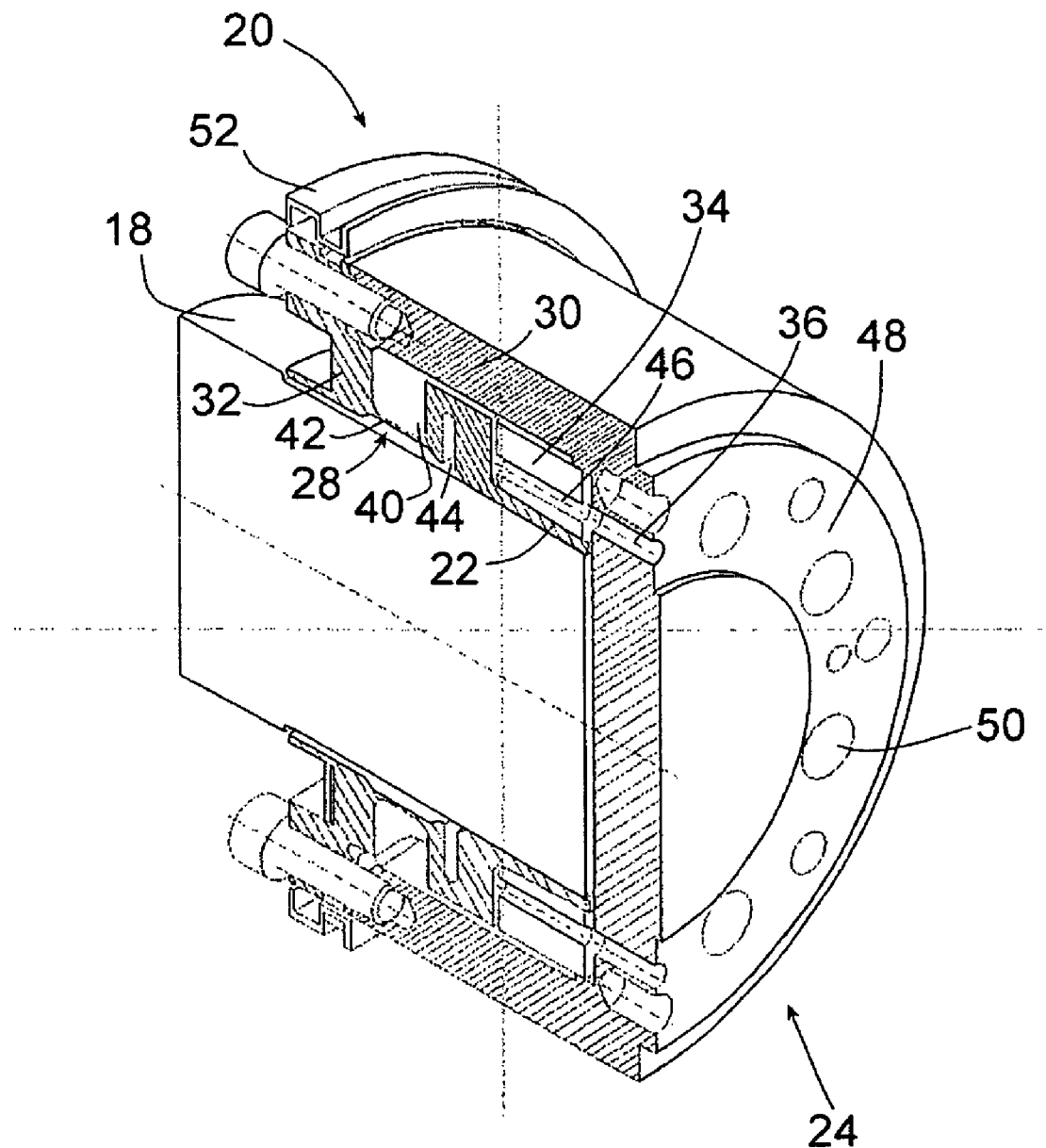
Figure 6:
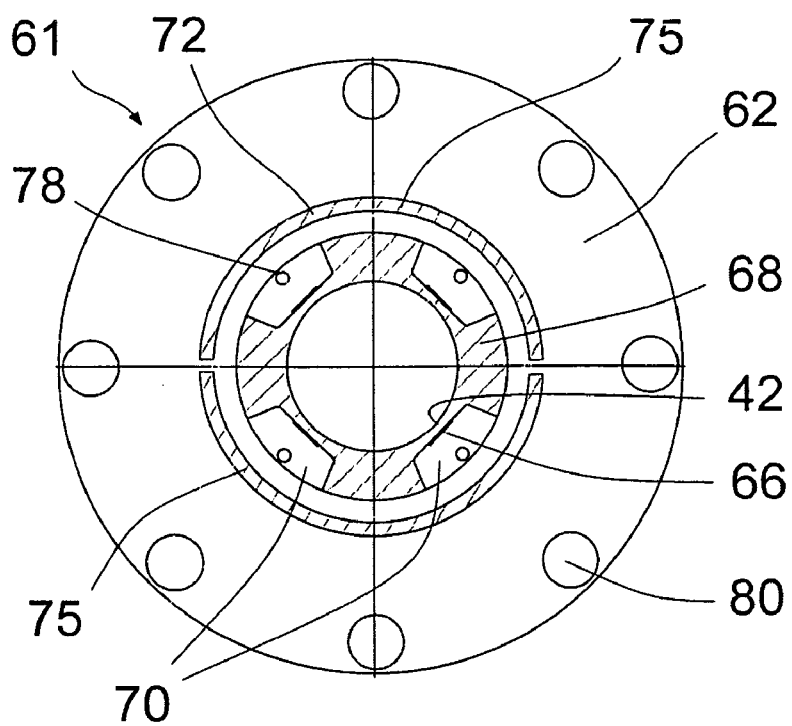
Figure 7:
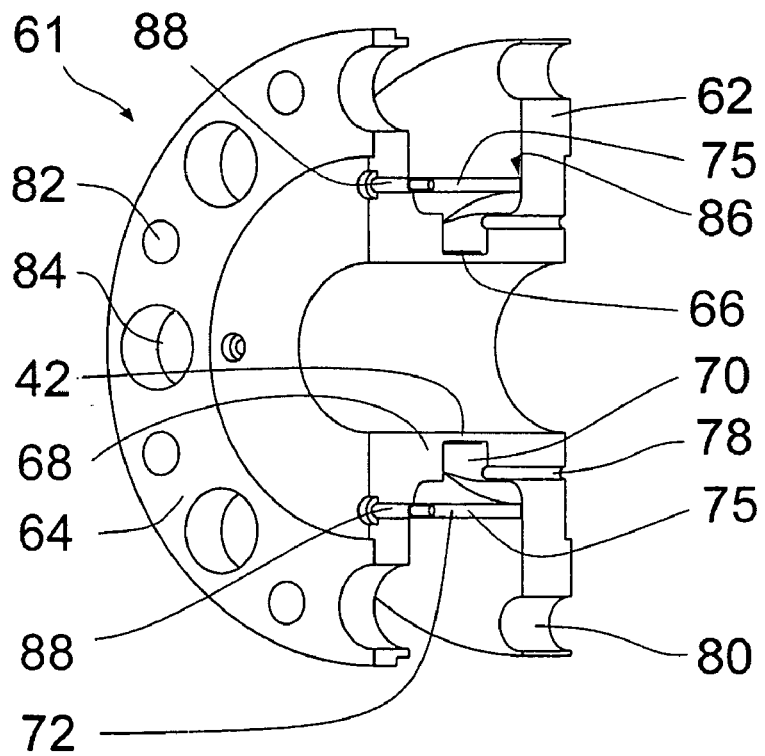
Figure 8:
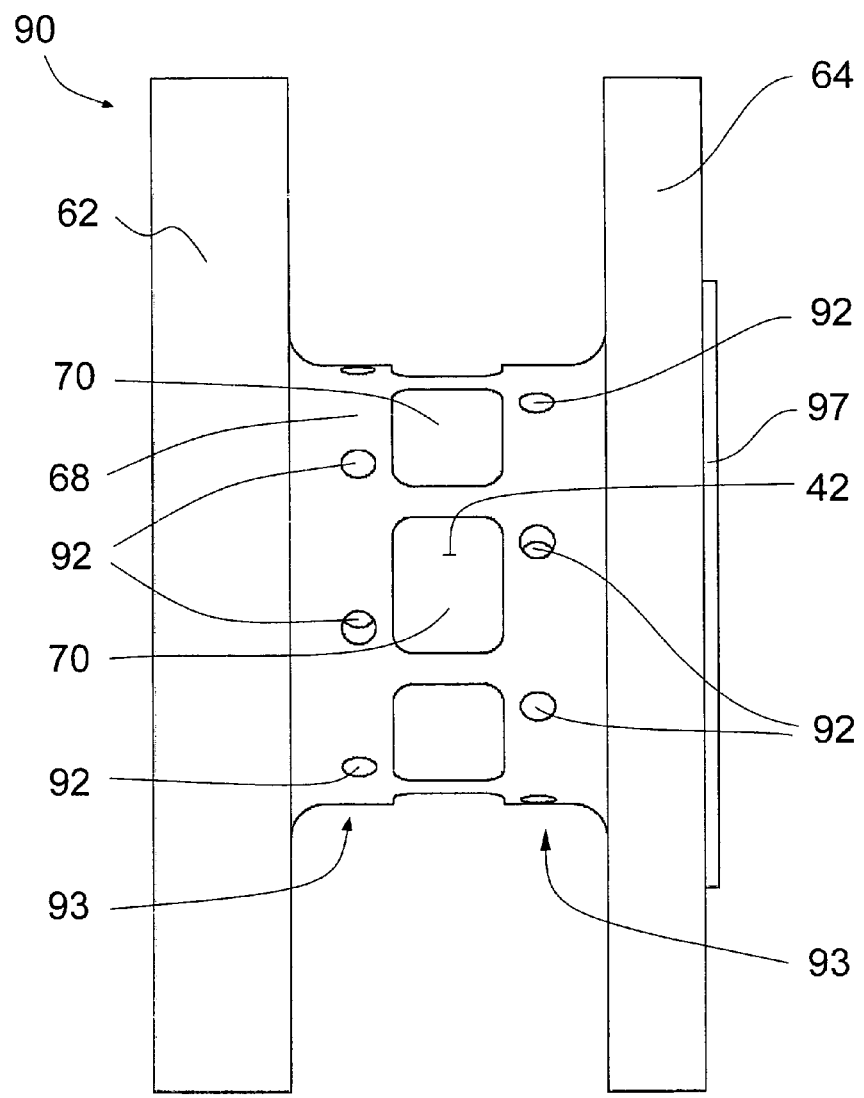
Figure 9:
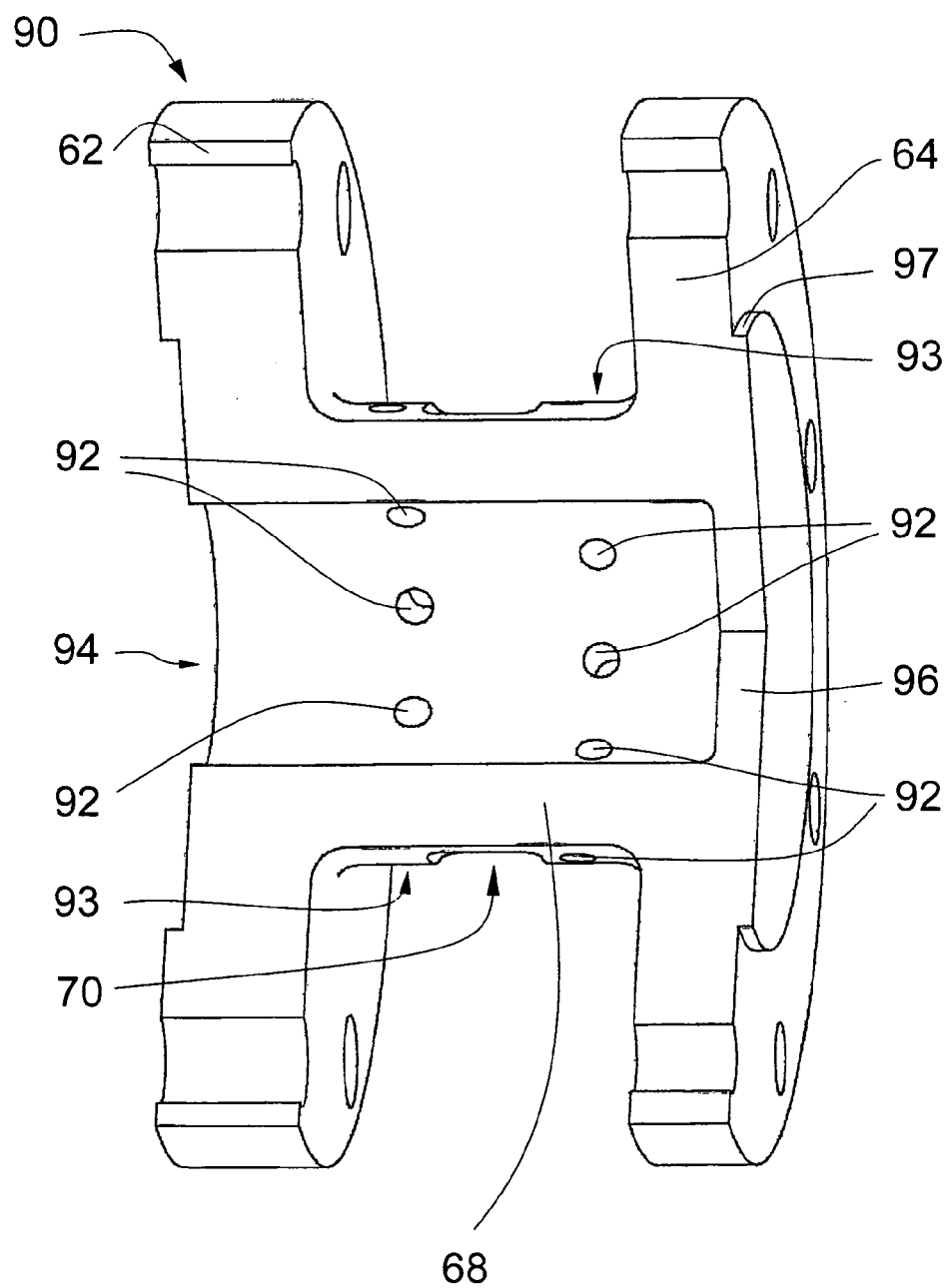
Figure 10:
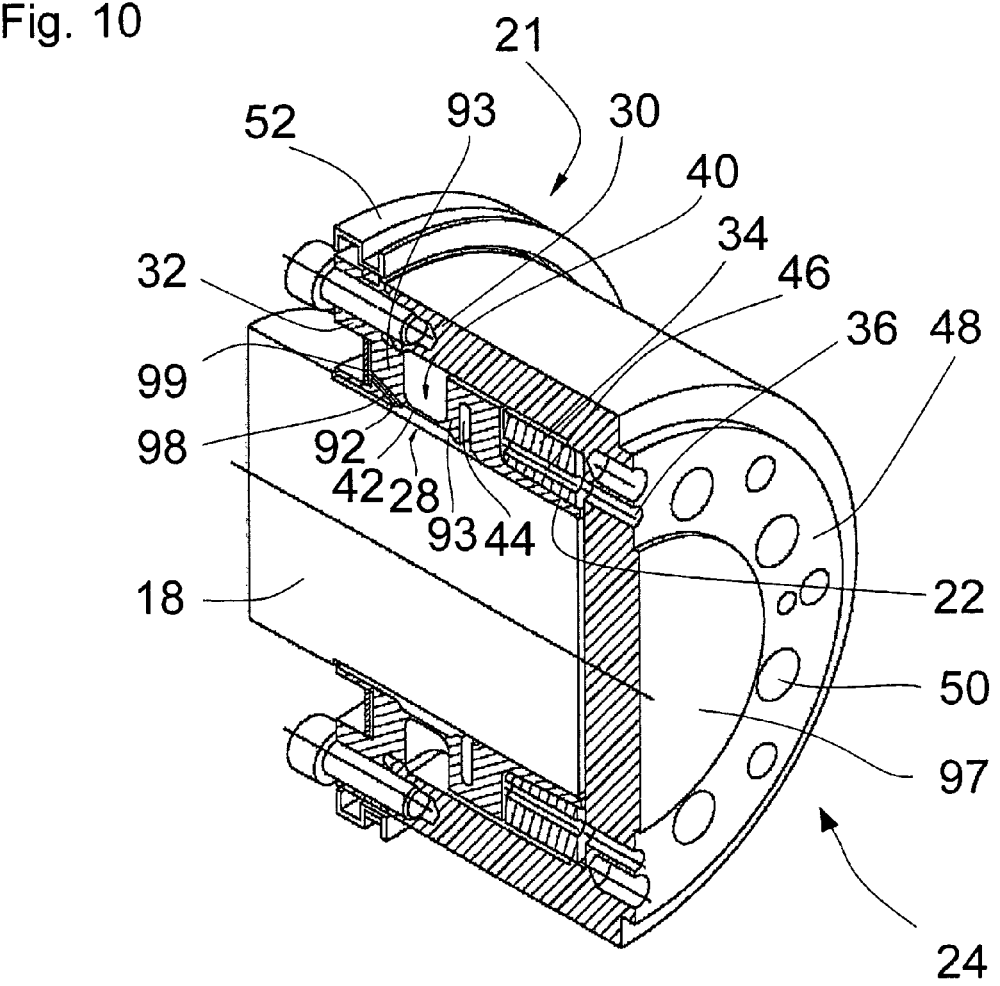

Other advantages, aims, and properties of the present invention will be explained using the following description of the attached drawings. In the drawings, the figures show:

FIG. 1 a schematic sectional representation of a torque measurement device, which is connected with a driving device in the form of an electric motor, FIG. 2 a schematic sectional representation of an exemplary embodiment of a torque measurement device, which is connected with a driving device in the form of an electric motor, and FIG. 3 a three-dimensional representation of another exemplary embodiment of a torque measurement device, of which only one half is shown, in order to illustrate a sectional surface parallel to the longitudinal axis;

FIG. 4 a schematic sectional view of another exemplary embodiment of a torque measurement device;

FIG. 5 a three-dimensional representation of the torque measurement device according to FIG. 4, of which only one half is shown, in order to illustrate a sectional surface parallel to the longitudinal axis;

FIG. 6 a schematic side view of another exemplary embodiment of a torque measurement device;

FIG. 7 a three-dimensional representation of the torque measurement device according to FIG. 6, of which only one half is shown, in order to illustrate a sectional surface parallel to the longitudinal axis;

FIG. 8 a side view of another exemplary embodiment of a torque measurement device;

FIG. 9 a partially broken open representation of the torque measurement device according to FIG. 8; and FIG. 10 a three-dimensional representation of another exemplary embodiment of a torque measurement device, in a representation similar to FIG. 3.

FIG. 1 shows a schematic sectional representation of a torque measurement device 10, which is connected with a driving device in the form of an electric motor 12. The torque measurement device 10, in known manner, has a torque measurement shaft 16 disposed between two flanges 14. The torque measurement shaft 16 is spaced apart from the drive shaft 18 in the axial direction of the latter.

The torque measurement device has a distance measurement device 54 with which the distance between the flanges 14 can be measured locally. In this manner, an angle position of the two flanges can be determined, and a conclusion can be drawn concerning a corresponding bending moment. Also, the flange 14, which faces away from the drive shaft 18, has bores 36 through which a tool for activating a clamping ring 34 can be passed. This makes it possible to build the torque measurement device 10 significantly more closely to the electric motor 12, and to save corresponding space in this manner.

The torque measurement device 20, as shown in FIG. 2, is connected with a driving device 12 in the form of an electric motor 12. The torque measurement device 20 has two flanges 22, 24 and is connected with a drive shaft 18 of the electric motor 12 by way of a first one of the two flanges 22. Between the second flange 24 and a torque measurement shaft 28, an intermediate shaft 30 is provided, which is disposed axially at the same height as the torque measurement shaft 28 on a different radius, whereby here the term "between" does not relate to the spatial arrangement, but rather relates to the flow of force or torque. Between the torque measurement shaft 28 and the intermediate shaft 30, a connecting flange 32 is provided, which makes available a radial spacing between the intermediate shaft 30 and the torque measurement shaft 28.

As is evident from FIG. 2, the torque measurement device 20 according to the invention is configured in such a manner that the torque measurement shaft 28 can be disposed axially at the height of the drive shaft 18 and radially outside of the drive shaft 18, so that another component (not shown here), such as, for example, a shaft or an axle or the like can be brought significantly closer to the drive shaft 18, in contrast to known solutions, by being connected to the second of the two flanges 24, accompanied by the creation of a significant axial space saving, as a comparison with FIG. 1 shows.

The first of the two flanges 22 has an attachment element in the form of a conically configured clamping ring 34, which can be pushed onto the first flange 22 in order to attach the first flange 22 to the drive shaft 18, in order to create a firm connection between the first flange 22 and the drive shaft 18 by way of a usual wedging effect. The clamping ring 34 can be activated by way of activation openings in the form of bores 36, which are formed in the second flange 24, through the second flange 24.

In order to detect excessive bending stress of the torque measurement shaft 28 of the torque measurement device 20 during operation of the torque measurement device 20, an excessive bending stress that occurs perpendicular to the axis of rotation can be detected by means of a binary contact measurement, in such a manner that only when contact exists between the torque measurement shaft 28 and the intermediate shaft 30, as the result of an excessive bending stress, is a signal or a significant signal change output to a display device or evaluation unit. The contact measurement preferably takes place by way of a measurement of the electrical resistance (illustrated schematically in FIG. 2 by means of a measurement symbol) between the metallic intermediate shaft 30 and the metallic torque measurement shaft 28, which resistance decreases significantly when contact exists between the intermediate shaft 30 and the torque measurement shaft 28. Alternatively, it is also possible to make available a contact measurement by means of measuring the electrical resistance between a counter-shaft 38 in the form of the driving shaft 18 of the electric motor 12 and the torque measurement shaft 28, since the torque measurement shaft 28 can also have contact with the drive shaft 18 of the electric motor 12 in the case of excessive bending stress.

As is directly evident, this arrangement furthermore also prevents excessive stress on the torque measurement shaft 28 as the result of bending moments, in structurally very simple manner, since the torque measurement shaft 28 is supported on the counter-shaft 38 or by means of corresponding contact of the intermediate shaft 30 with the flange 22 or with the clamping ring 34.

FIG. 3 shows a three-dimensional representation of another exemplary embodiment of a torque measurement device 20 according to the invention, of which only one half is shown, in order to illustrate a sectional surface parallel to the longitudinal axis.

The torque measurement device 20 shown in FIG. 3 has a first flange 22 and a second flange 24, whereby a torque measurement shaft 28 is disposed between the two flanges 22, 24. The torque measurement shaft 28 is completely hollow, and is essentially configured as a hollow cylinder, and disposed radially on the outside, at the level of a drive shaft 18, shown schematically, which shaft is connected with the torque measurement device 20 by way of the first flange 22. In this exemplary embodiment, a plurality of strain gauges is disposed on the radially outer surface. In an alternative embodiment, alternatively or cumulatively to the aforementioned strain gauges, a plurality of strain gauges, not shown, can be affixed on the radially inner surface of the torque measurement shaft 28. On the radially outer surface, one or more recesses 40 are provided, in order to form thin-walled measurement membranes 42 that can easily be deformed as the result of stresses, accompanied by the creation of a very sensitive measurement possibility for a torque transferred to the torque measurement device 20, in connection with the strain gauges.

The torque measurement shaft 28 is separated from a region that borders on the first flange 22 by means of a ring groove 44, whereby the ring groove 44 is provided for the purpose of making available a certain mechanical uncoupling of the torque measurement shaft 28 from the first flange 22. With the mechanical uncoupling made available in this manner, the sensitivity of a torque measurement to be undertaken can be significantly increased.

Between the second flange 24 and the torque measurement shaft 28, an intermediate shaft 30 is provided, which is disposed axially at the same height as the torque measurement shaft 28 on a different radius, whereby here, the term "between" relates not to the spatial arrangement, but rather relates to the flow of force or torque. Between the torque measurement shaft 28 and the intermediate shaft 30, a connecting flange 32 is provided, which makes available a radial spacing between the intermediate shaft 30 and the torque measurement shaft 28.

The first of the two flanges 22 has an attachment element 34 in the form of a conically configured clamping ring 34, which can be pushed onto the first flange 22 in order to attach the first flange 22 to the drive shaft 18, in order to create a firm connection between the first flange 22 and the drive shaft 18 by way of a usual wedging effect. The attachment element 34 can be activated by way of an activation opening in the form of a bore 36, which is formed in the second flange 24, through the second flange 24, whereby the activation can take place by way of a screw (not shown), which can be screwed into a threaded hole (not shown) of the torque measurement device 20, which hole faces the clamping ring 34, and is disposed in an opening 46 that passes through the clamping ring 34, with a center section.

The second flange 24 is configured essentially in the shape of a circular disk and has a projecting, circular-ring-shaped connecting surface 48 in order to create a centering possibility, which surface is provided for connecting a shaft or any desired other component, such as, for example, the component of a machine. Bores 50 are provided for a simple connection with other modules.

On the side of the torque measurement device 20 that faces away from the second flange 24, a telemetry ring 52 is provided, which transmits the measurement signals made available by the strain gauges to a location spatially separate from the torque measurement device 20, in known manner.

The torque measurement device 60 shown in FIGS. 4 and 5 corresponds essentially to the torque measurement device 10 according to FIG. 1, and can be used accordingly. The torque measurement device 60 also has a first flange 62 and a second flange 64, whereby the first flange 62, corresponding to the exemplary embodiment according to FIG. 1, can be attached to a driving shaft of an electric motor by means of a corresponding clamping ring, which can particularly be easily adapted by any user, in accordance with the requirements. In this connection, it is understood that of course, other methods of attachment can also be used.

Between the two flanges 62 and 64, strain gauges 66 (numbered as examples) are disposed on a torque measurement shaft 68, in recesses 70 (numbered as examples). In this exemplary embodiment, the strain gauges 66 are exclusively provided radially on the outside, in the membranes formed by the recesses, as is particularly true in the other exemplary embodiments that are explained in the present case. It was found that in this way, the measurement accuracy can be significantly increased. On the other hand, it is also possible to provide strain gauges cumulatively or alternatively to this, at a different location, for example lying radially on the inside.

As protection for the strain gauges and—if applicable— electronics provided in their vicinity, a protective cover 72 in the form of a one-piece closed sleeve 74 is provided on the flange 64, which sleeve, in this exemplary embodiment, is shrink-fitted onto the flange 64. Such a closed sleeve can be applied to the flange in extremely symmetrical manner, so that any imbalances that would distort a measurement result can be avoided, to the greatest possible extent, particularly also at very high speeds of rotation. This particularly holds true also for shrink-fitting as a method of attachment, whereby here, other methods of attachment, such as, for example, welding, soldering, riveting, or screwing can also be used.

In this exemplary embodiment, a speed of rotation ring 76 is provided on the closed sleeve 74, by means of which ring the speed of rotation of the torque measurement device 60 can be determined. This embodiment particularly makes it possible to adapt the speed of rotation ring 76 individually, for example in accordance with individual customer wishes, something that can be implemented more easily, in terms of construction, than machining the flange 62 accordingly, for example.

If necessary, other modules of the torque measurement device 60 can also be provided on the closed sleeve 74 or on the protective cover 72, such as, for example, inductive current couplers or optical data transmitters, as they are known from the state of the art. In the present exemplary embodiment, however, the measurement value transmission takes place by way of electrical feed lines that lead through cable ducts 78, so that in this manner, the data transmission can take place axially outside of the two flanges 62, 64. In this connection, the cable ducts 78 are implemented as essentially coaxially disposed bores, so that the overall rigidity and useful lifetime are only impaired insignificantly, if at all.

Bores 80 and 82 (numbered as examples, in each instance) allow attachment of the torque measurement device to other modules, for example to drive shafts, as drives or power take-offs, or to clamping rings or the like. Furthermore, the flange 64 also has activation bores 84 through which a tool can be passed to the bore 80, in order to activate a screw or another attachment device there. Depending on the concrete implementation of the present invention, the activation bore 84 can be designed in such a manner that any attachment devices are held there within the two flanges, in non-detachable manner. On the other hand, the activation bores 84 can also be selected to be sufficiently large so that attachment devices themselves can be put through them. If necessary, additional activation bores can also be provided, in order to also activate other modules, such as clamping rings and the like, for example, which are disposed behind the flange 62, seen from the flange 64.

Between the closed sleeve 74 or the protective cover 72, a gap 86 remains, so that the protective cover 72 does not impair the torque measurement. If, however, any bending moments that occur between the two flanges 62 and 64 exceed a certain value, the sleeve 74 comes into contact with the flange 62, and this makes any further bending processes significantly more difficult. In this way, the torque measurement shaft 68 is protected. Contact between sleeve 74 and flange 62 can also be used, as was already explained above, as the signal of an overly great bending moment, and this can be carried out by means of a corresponding resistance measurement, for example.

The torque measurement device 61 shown in FIGS. 6 and 7 essentially corresponds to the torque measurement device 60 according to FIGS. 4 and 5, so that identical modules, or modules having the identical effect, are also numbered identically, and the device can therefore also be used in accordance with the torque measurement device 10 shown in FIG. 1.

The torque measurement device 61 also has a first flange 62 and a second flange 64, whereby the first flange 62 can be attached in accordance with the exemplary embodiments according to FIGS. 1, 4, and 5.

Between the two flanges 62 and 64, strain gauges 66 (numbered as examples) are disposed on a torque measurement shaft 68, in recesses 70 (numbered as examples). In the case of this exemplary embodiment, as well, the strain gauges 66 are provided exclusively radially on the outside, in the membranes formed by the recesses.

As protection for the strain gauges, and—if applicable—electronics provided in their vicinity, in this exemplary embodiment a protective cover 72 in the form of two half-shells 75 is provided on the flange 64, disposed radially within the flanges 62, 64 and between them, which half-shells, in this exemplary embodiment, are connected with the flange 64 by way of two attachment screws 88, in each instance. Of course, the half-shells can also be attached to the flange 62, or other methods of attachment can be used. Likewise, other attachment points rather than only two, or only a single attachment point can be provided. Also, the two half-shells 75 can be connected with one another after having been inserted between the two flanges 62, 64, and this can take place, for example, by means of tack welding. Likewise, it is possible to provide more than two half-shells. In this exemplary embodiment, gaps (not numbered, but can be seen in FIG. 6) remain between the two half-shells 75, through which signal lines or other cables can be passed radially to the outside, if necessary. Also, a signal transmission, for example an optical signal transmission, can be provided by means of these gaps, and for this purpose, additional openings, for example bores, can be provided in the protective cover 74, if necessary, also in the case of other exemplary embodiments. The projecting configuration of the protective cover 72 has the advantage that this cover lies radially farther on the inside, so that tensions that result from the centripetal force that acts on the protective cover 72 cannot have as great an influence. However, the use of half-shells and the attachment at points brings about an increased risk of such imbalances, as compared with the exemplary embodiment explained above. However, this risk can be countered by using a very light material for the half-shells 75.

If necessary, other modules of the torque measurement device 60 can be provided on the half-shells 75 or on the protective cover 72, such as, for example, inductive current couplers or optical data transmitters, as they are known from the state of the art. In the present exemplary embodiment, however, the measurement value transmission takes place by way of electrical feed lines, which pass through cable ducts 78, so that in this manner, the data transmission can take place axially outside of the two flanges 62, 64. In this connection, the cable ducts 78 are implemented as bores disposed essentially coaxially, so that the overall rigidity and useful lifetime are impaired only slightly, if at all.

Bores 80 and 82 (numbered as examples, in each instance) allow attachment of the torque measurement device to other modules, for example to drive shafts, as drives or power take-offs, or to clamping rings or the like.

Furthermore, the flange 64 also has activation bores 84, through which a tool can be passed to the bore 80, in order to activate a screw or some other attachment device there. On the other hand, it is possible to do without the activation bores 84, if necessary, since the interstice between the two flanges 62, 64 is also accessible from the outside in this exemplary embodiment. On the other hand, simple corresponding access even under very restricted structural conditions can be guaranteed by the bores 84, or also by other activation openings.

Between the half-shells 75 or the protective cover 72, a gap 86 remains also in this exemplary embodiment, so that the protective cover 72 does not impair the torque measurement. If any bending moments that occur between the two flanges 62 and 64 exceed a certain value, however, then at least one of the half-shells 75 comes into contact with the flange 62, by way of the gap 86, and this makes further bending processes significantly more difficult. In this way, the torque measurement shaft 68 is protected. The contact between the half-shells 75 and the flange 62 can also, as was already explained above, be used as a signal of an overly great bending moment, and this can be carried out by means of a corresponding resistance measurement, for example. In this exemplary embodiment, the gap 86 is oriented essentially radially, so that the protective cover 72 makes contact with the flange 62 essentially coaxially, if the bending moments become too great. In this way, the protective cover 72 can counter bending forces very effectively, even independent of the other characteristics of the present invention.

In the torque measurement device 90 according to FIGS. 8 and 9, a protective cover as described above can also be provided. On the other hand, this exemplary embodiment has openings 92 that lie radially on the inside and face radially to the outside, which are formed by radially directed bores in this exemplary embodiment, which bores reach from the outside into a cavity 94 that lies on the inside, and can be closed off by means of screws inserted into them, not shown here. In place of a closure by means of screws, the bores can also be closed off by means of adhesive or solder or a weld point, whereby the screws can advantageously be used as imbalance means and to influence the local bending rigidity, by means of being screwed in to different depths. The cavity 94 of this exemplary embodiment is closed off on one side by means of a wall 96 of the flange 64, while the other side can be closed off by means of a solid shaft that can be set onto the flange 62, for example.

Axially on the outside, a round projection 97 is additionally provided on the outside of the flange 64, which projection can serve as a positioning aid for a module to be set onto the flange 64, whereby it is understood that a projection 97 that serves as a positioning aid or a corresponding recess axially on the outside of a flange of the torque measurement device is advantageous even independent of the other characteristics of the present invention.

It is understood that the openings 92 can also serve as cable ducts, if this is advantageous, for example, for the electrical connection of strain gauges, which are preferably disposed radially on the outside in the recesses 70 on the corresponding measurement membranes 42, to electrical components in the interior of the cavity 94. This holds true vice versa also for any strain gauges that are affixed on the cylindrical wall of the cavity 94, radially on the inside, and are supposed to be connected with electrical components outside of the cavity 94.

As is directly evident, the openings 92 are spaced apart from the measurement membranes 42 and the walls of the corresponding recesses 70, so that in this way, the tension progression of the measurement membranes 42 and any strain gauges or similar measurement devices that are disposed on the measurement membranes 42 is not influenced, or only influenced insignificantly. In fact, the openings 92 are provided in the regions of the torque measurement shaft 68, in each instance, that are configured to be solid, in other words either distributed on the circumference between the recesses 70, or spaced axially apart from the recesses 70—as in the present exemplary embodiment—in an otherwise closed pipe-shaped section 93. While it is true that this brings about the disadvantages already explained above, particularly the fact that complicated sealing is now necessary, because of the tubular section that is now not closed off, which connects the two flanges, it does allow a targeted influence on the tension progression in the solid regions of the torque measurement shaft 68, without having an overly detrimental influence on the local tension progression in the measurement membranes 42.

The torque measurement device 21 shown in FIG. 10 essentially corresponds to the torque measurement device 20 according to FIG. 3, so that modules having the identical effect are also numbered identically.

Thus, the torque measurement device 21 also has a first flange 22 and a second flange 24, whereby a torque measurement shaft 28 is disposed between the two flanges 22, 24. The torque measurement shaft 28 is completely hollow and essentially configured as a hollow cylinder, and disposed radially on the outside, at the height of a schematically represented drive shaft 18, which is connected with the torque measurement device 20 by way of the first flange 22. Multiple recesses 40 are provided on the radially outer surface, in order to form thin-walled measurement membranes 42 that can easily be deformed as the result of stresses, accompanied by the creation of a very sensitive measurement possibility for a torque to be transferred to the torque measurement device 20, in combination with the strain gauges. A plurality of strain gauges is disposed on the radially outer surface of the measurement membranes 42 in this exemplary embodiment, as well. In an alternative embodiment, a plurality of strain gauges, not shown here, can be affixed, alternatively or cumulatively, on the radially inner surface of the torque measurement shaft 28.

Between the second flange 24 and the torque measurement shaft 28, an intermediate shaft 30 is provided, which is disposed axially at the same height as the torque measurement shaft 28 on a different radius, where here, the term "between" relates not to the spatial arrangement, but rather relates to the flow of force or torque. A connecting flange 32 is provided between the torque measurement shaft 28 and the intermediate shaft 30, which flange makes available a radial spacing of the intermediate shaft 30 from the torque measurement shaft 28.

The first of the two flanges 22 has an attachment element 34 in the form of a conically configured clamping ring 34, which can be pushed onto the first flange 22 in order to attach the first flange 22 to the drive shaft 18, in order to create a firm connection between the first flange 22 and the drive shaft 18 by way of a usual wedge effect. The attachment element 34 can be activated by way of an activation opening in the form of a bore 36 that is formed in the second flange 24, through the second flange 24, whereby the activation can take place by way of a screw (not shown), which can be screwed into a threaded hole (not shown) of the torque measurement device 20, which hole faces the clamping ring 34, and is disposed in an opening 46 that passes through the clamping ring 34, with a center section.

The second flange 24 is configured essentially in the form of a circular disk and has a projecting, circular-ring-shaped connecting surface 48 for creating a centering possibility, and a projection 97 that is provided for the connection with a shaft or any other desired component, such as, for example, the component of a machine. Bores 50 are provided for a simple connection to other components.

A telemetry ring 52 is provided on the side of the torque measurement device 20 that faces away from the second flange 24, which ring transmits the measurement signals made available by the strain gauges to a location spatially separate from the torque measurement device 20, in known manner.

The torque measurement device 28 and a corresponding first pipe-shaped section 93 are separated from a region that borders on the first flange 22, by means of a ring groove 44, whereby the ring groove 44 is provided for the purpose of making available a certain mechanical uncoupling of the torque measurement shaft 28 from the first flange 22. With the mechanical uncoupling made available in this manner, the sensitivity of the torque measurement to be performed can be significantly increased. The same task is fulfilled, in this exemplary embodiment, by openings 92 that are provided as slanted bores 98 in a pipe-shaped section 93 that follows the connecting flange 32. Cables can also be passed through the bores 98, whereby the bores 98 are covered by a cover 99 that also protects electrical devices that are disposed between the section 93 and the cover 99.

Reference Symbol List
10 torque measurement device
12 electric motor
14 flange
16 torque measurement shaft
18 drive shaft
20 torque measurement device
21 torque measurement device
22 first flange
24 second flange
28 torque measurement shaft
30 intermediate shaft
32 connecting flange
34 clamping ring
36 bore
38 counter-shaft
40 recess
42 measurement membrane
44 ring groove
46 opening, clamping ring
48 connecting surface
50 bore
52 telemetry ring
54 distance measurement device
56 activation bore, clamping ring
60 torque measurement device
61 torque measurement device 62 first flange
64 second flange
66 strain gauge
68 torque measurement shaft
70 recesses
72 protective cover
74 closed sleeve
75 half-shell
76 speed of rotation ring
78 cable duct
80 bore
82 bore
84 activation bore
86 gap
88 attachment screws
90 torque measurement device
92 openings
93 pipe-shaped section
94 cavity
96 wall
97 projection
98 slanted bore
99 cover

The invention claimed is:

1. Torque measurement device (20) having a torque measurement shaft (28) disposed between a first flange (22) and a second flange (24) of two flanges (22, 24), wherein an intermediate shaft (30) is provided between the second flange (24) of the two flanges (22, 24) and the measurement shaft (28) and the measurement shaft (28) being provided between the intermediate shaft (30) and the first flange (22) of the two flanges (22, 24), which intermediate shaft is disposed axially at the same height as the measurement shaft (28) on a different radius, wherein the intermediate shaft (30) has a greater radius than the measurement shaft (28).

2. Torque measurement device (20) according to claim 1, wherein a connecting flange (32) is provided between the measurement shaft (28) and the intermediate shaft (30).

3. Torque measurement device (20) having a torque measurement shaft (28) disposed between two flanges (22, 24), according to claim 1, further comprising a protective cover that is disposed radially outside of the measurement shaft, at least on one of the two flanges (22, 24).

4. Torque measurement device according to claim 3, wherein the protective cover is attached to one of the two flanges (22, 24), on one side.

5. Torque measurement device according to claim 3, wherein measurement value transducers are disposed on the torque measurement shaft (28), only on the outside, which transducers are protected by the protective cover.

6. Torque measurement device (20) having a torque measurement shaft (28) or torque measurement disk disposed between two flanges (22, 24), wherein one of the two flanges (22, 24) has at least one attachment element (34) that can be activated through the second of the two flanges (22, 24).

7. Torque measurement device (20) according to claim 6, wherein the second of the two flanges (22, 24) has at least one activation opening (36).

8. Torque measurement device (20) according to claim 7, wherein the activation opening (36) is a bore.

9. Torque measurement device (20) comprising a means for determining a bending moment that occurs perpendicular to an axis of rotation, wherein the bending moment is measured in binary manner.

10. Torque measurement device (20) according to claim 9, wherein the bending moment is determined as a relative movement between a torque measurement shaft (28) or a torque measurement disk and another module.

11. Torque measurement device (20) according to claim 10, wherein the other module is a counter-shaft (30, 38).

12. Torque measurement device (20) according to claim 11, wherein the torque measurement shaft (28) is connected with the counter-shaft (30) by way of a connecting flange (32).

13. Arrangement composed of a torque measurement device (20) and a drive shaft (18), whereby the torque measurement device (20) has a torque measurement shaft (28) or a torque measurement disk disposed between a first flange (22) and a second flange (24) of two flanges (22, 24), wherein an intermediate shaft (30) is provided between the second flange (24) of the two flanges (22, 24) and the torque measurement shaft (28) or the torque measurement disk and the torque measurement shaft or the torque measurement disk being provided between the intermediate shaft (30) and the first flange (22) of the two flanges (22, 24), which intermediate shaft is disposed axially at the same height as the measurement shaft (28) or the torque measurement disk, wherein the intermediate shaft (30) has a greater radius than the torque measurement shaft (28) or the torque measurement disk, wherein the torque measurement shaft (28) or the torque measurement disk is disposed axially at the same height of the drive shaft (18) and radially outside of the drive shaft (18), with at least one region.

14. Arrangement according to claim 13, wherein the torque measurement shaft (28) or the torque measurement disk is configured to be completely hollow and is disposed radially on the outside, at the height of the drive shaft (18).

15. Arrangement according to claim 13, wherein the torque measurement shaft (28) or the torque measurement disk is a torque measurement shaft (28) that is configured to be essentially cylindrical or hollow-cylindrical.

16. Arrangement according to claim 13, wherein the drive shaft (18) is a shaft of an electric machine.

17. Torque measurement device (20) having a torque measurement shaft (28) disposed between a first flange (22) and a second flange (24) of two flanges (22, 24), wherein an intermediate shaft (30) is provided between the second flange (24) of the two flanges (22, 24) and the measurement shaft (28) and the measurement shaft (28) being provided between the intermediate shaft (30) and the first flange (22) of the two flanges (22, 24), which intermediate shaft is disposed axially at the same height as the measurement shaft (28) on a different radius and forms a protective cover that is disposed radially outside of the measurement shaft at least on one of the two flanges (22, 24).

18. Torque measurement device (20) having a torque measurement shaft (28) disposed between a first flange (22) and a second flange (24) of two flanges (22, 24), wherein an intermediate shaft (30) is provided between the second flange (24) of the two flanges (22, 24) and the measurement shaft (28) and the measurement shaft (28) being provided between the intermediate shaft (30) and the first flange (22) of the two flanges (22, 24), which intermediate shaft is disposed axially at the same height as the measurement shaft (28) on a different radius, wherein expansion sensors are disposed on the torque measurement shaft (28), exclusively radially on the outside.

19. Torque measurement device (20) according to claim 18, wherein the expansion sensors are strain gauges (66).

20. Torque measurement device (20) according to claim 18, wherein the expansion sensors are disposed on level surface regions of measurement membranes (42).

* * * * *